Nov. 2, 1943.   F. S. STICKNEY ET AL   2,333,596
THERMOCOUPLE MEASURING INSTRUMENT
Filed Oct. 26, 1940
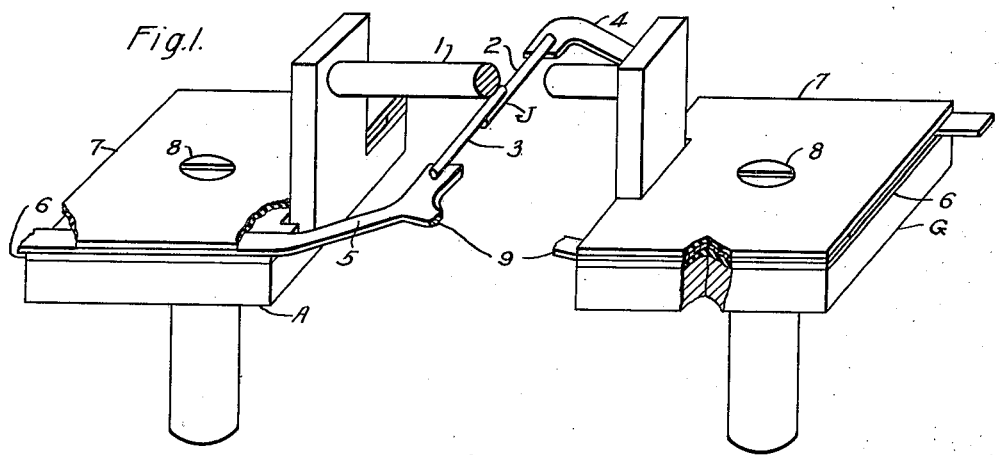
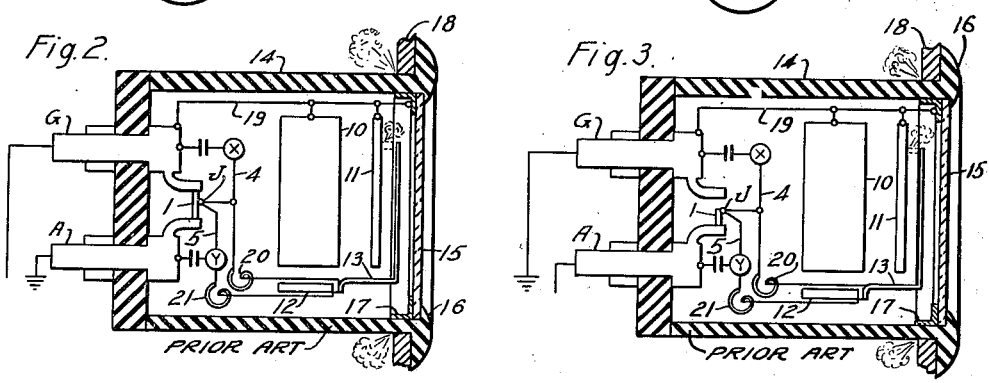
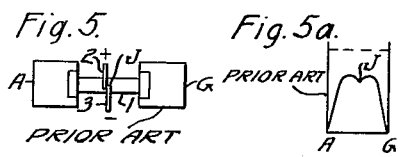  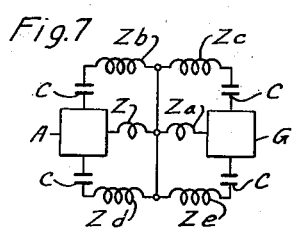 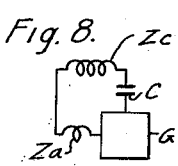
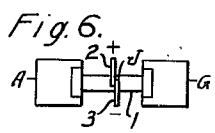 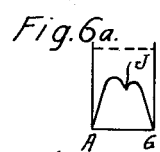
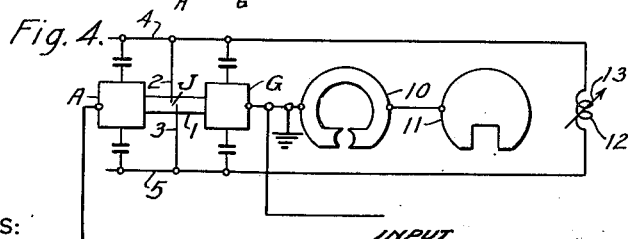
WITNESSES:  
H. F. Susser  
C. L. Freedman
INVENTORS  
Fernald S. Stickney and  
Richard C. Hitchcock.  
BY  
ATTORNEY Patented Nov. 2, 1943

2,333,596

UNITED STATES PATENT OFFICE 2,333,596

THERMOCOUPLE MEASURING INSTRUMENT

Fernald S. Stickney, West Caldwell, and Richard C. Hitchcock, Upper Montclair, N. J., assignors to Westinghouse Electric & Manufacturing Company, East Pittsburgh, Pa., a corporation of Pennsylvania Application October 26, 1940, Serial No. 362,934

12 Claims. (Cl. 171—95)

This invention relates to electrical converters, and it has particular relation to thermocouples for energizing permanent magnet instruments.

Because of their high sensitivity, direct current instruments often are employed in conjunction with converters for measuring alternating current quantities. For example, permanent magnet or d'Arsonval instruments are extremely desirable for this purpose.

When a d'Arsonval instrument is employed for alternating current measurements, it is customary to employ a suitable electrical converter for producing a direct current energization for the d'Arsonval instrument which is dependent upon the alternating current quantity to be measured. Two types of converters are generally employed in the art. These are the rectifier and the thermocouple. The rectifier produces a direct current energization which is dependent upon the average value of alternating current quantities. On the other hand, the thermocouple provides an energization which is dependent upon a heating effect, and consequently, varies with the root-mean-square (R. M. S.) value of an alternating current quantity to be measured. Since most electrical computations and calibrations are carried out in root-mean-square quantities, an accurate root-mean-square measuring instrument is desirable. Although the rectifier instrument is calibrated to read in root-mean-square values, it is subject to errors caused by peculiar wave forms of certain alternating current quantities to be measured. This is for the reason that, as above pointed out, the rectifier instrument is dependent upon average rather than upon root-mean-square values.

A further advantage inherent in the thermocouple is encountered in the field of high frequency measurements. Because of the high capacities present in rectifiers, such devices seldom are suitable for high frequency instruments. Consequently, it is standard practice to employ thermocouples for high frequency measurements.

As well understood in the art, a thermocouple includes a heater element which is energized by the alternating current quantity to be measured. Consequently, the heat produced by the heater element is dependent upon the quantity to be measured. Adjacent the heater element a thermojunction is positioned to be heated by the heater element. The thermojunction may be insulated from the heater element, but for general purposes, a metallic bond, such as that provided by soldering or welding, is preferable.

Roughly, the temperature of a heater element employed in a thermocouple varies as the square of the alternating current quantity flowing therethrough. For this reason, the overload capacity of the heater element is extremely small. In actual practice, the overload capacity of a heater element may be less than twice the full load rating thereof. This explains the frequent failure of thermocouples encountered in practice. A further reason for failure resides in the desirability of a rapid response from the thermocouple. To increase the rapidity of response, it is customary to reduce the thermal inertia of the heater element to as low a value as is practicable. Because of the small overload capacity, and because of the low thermal inertia, it is practically impossible to protect such thermocouples by fuses or other means.

It has been observed that the thermocouple is employed in combination with a direct current measuring instrument. Because of the connections employed between the thermocouple and the measuring instrument, a failure of the thermocouple heater element frequently has resulted in damage to the measuring instrument. Since the thermocouple represents an extremely small percentage of the cost of the combination, and since it may readily be replaced, it is desirable that a failure be restricted to the thermocouple alone.

In accordance with the invention, the heater element of a thermocouple is divided into two portions, one of which is designed to fail on overload before the remaining portion. The thermojunction is associated with the heater element intermediate these two portions. The parts of the measuring instrument which are to be grounded are connected to the terminal associated with that portion of the heater element which does not fail on overload. Consequently, when the heater element fails, both the parts of the instrument connected to the thermojunction and the parts of the instrument connected to the terminal remain connected to each other. For this reason, an excessive potential difference cannot be present between these two groups of parts.

The invention further contemplates the provision of a bypass across the heater element. This bypass is formed by the provision of a high capacity between the thermojunction and at least one of the terminals of the heater element. Since the thermocouple is employed generally for high frequency measurements, the high capacity tends to maintain the potential difference between parts of the measuring instrument at reasonably low values.

In accordance with a further aspect of the invention, the heater element is formed from a material which provides an increased overload capacity. Such a material preferably is metallic in order to permit a metallic bond between the heater element and the thermojunction. In addition, the material preferably has a negative temperature coefficient of resistance. This means that the resistance of the heater element decreases when subjected to overload currents. Since the magnitude of the current flowing through the heater element is not modified appreciably by the impedance of the heater element itself, the measuring instrument associated with the thermocouple instrument may be calibrated to read accurately. It will be observed that the reduction in the resistance accompanying overload currents results in a lower temperature for a given current than that provided by an equivalent heater element having a zero or positive temperature coefficient of resistance.

It is therefore, an object of the invention to provide a thermoconverter having improved characteristics suitable for measuring instruments.

It is a further object of the invention to provide a heater element for a thermocouple including two heater portions, only one of which is designed to fail initially on overload.

It is a still further object of the invention to provide a thermocouple having a heater element and a thermojunction which is asymmetric with respect to the terminals of the heater element.

It is another object of the invention to provide a thermocouple and a measuring instrument having parts connected through a portion of the heater element of the thermocouple wherein failure of the heater element does not interrupt the connection of the parts.

It is still another object of the invention to provide a thermojunction for a thermocouple which has a substantial capacity to at least one of the terminals of the heater element employed in the thermocouple.

It is a still further object of the invention to provide a heater element for a thermocouple having a negative temperature coefficient of resistance.

It is a still further object of the invention to provide a thermocouple having a thermojunction connected by a metallic bond to a metallic heater element having a negative temperature coefficient of resistance.

Other objects of the invention will be apparent from the following description taken in conjunction with the accompanying drawing, in which:

Figure 1 is a view in perspective with parts broken away of a thermocouple illustrating the invention;

Figs. 2 and 3 are views in cross section with parts diagrammatically shown illustrating various possible connections of thermocouple instruments;

Fig. 4 is a diagrammatic view of the instrument shown in Figs. 2 and 3;

Fig. 5 is a view in top plan of a thermocouple designed in accordance with the prior art;

Fig. 5a is a graphical view showing a heating curve for the thermocouple of Fig. 5;

Fig. 6 is a view in top plan of a thermocouple embodying this invention;

Fig. 6a is a graphical view showing a heating curve for the thermocouple of Fig. 6; and Figs. 7 and 8 are diagrammatic views showing equivalent circuits for a thermocouple.

Referring to the drawing, Fig. 1 shows a thermocouple including a heater element 1 which is connected between two terminals A and G. The heater element 1 in Fig. 1 has a portion broken away to expose a pair of thermojunction wires 2 and 3. At an intermediate point a thermojunction J is connected to the heater element. Such a connection may be established in various ways, as by enclosing the adjacent parts in a glass bead or by a suitable cement. Preferably, however, this connection to the heater element is established by a soldering or welding operation. It will be understood that the thermojunction J generally comprises two dissimilar metal wires 2 and 3 having their junction heated by the heater element 1. As is well known in the art, the thermojunction develops a direct current potential across its terminals which is dependent upon the temperature differential between its junction and the terminals.

The terminals for the metal wires 2 and 3 are illustrated as metallic strips 4 and 5 which are supported, respectively, by the terminals G and A. Each of the strips 4 and 5 is spaced from one of the terminals by means of a thin sheet of insulating material 6. This insulating material is designed to insulate the strips 4 and 5 electrically from the terminals G and A, but is designed to permit the passage of heat therebetween. For example, the sheets 6 may be formed of thin sheets of mica. The strips 4 and 5 may be attached to the terminals G and A in any suitable manner. As illustrated, clamping members 7 which may be of insulating material are attached to the terminals A and G by screws 8. These clamping members serve to clamp the strips 4 and 5 in position. If desired, either or both of the strips 4 and 5 may be supported from both of the terminals A and G. This is represented in Fig. 1 by an extension 9 of the strip 5 which is clamped to the terminal G.

The sheet of mica 6 is employed partly to control the temperature of the cold terminals of the thermo-junction J. Because of the heat conduction through the mica sheet, the strips 4 and 5 are brought substantially to the temperature of the terminals G and A. By proper design of the various parts, the thermocouple may be compensated for ambient temperature. A more detailed discussion of this compensation will be found in the United States Patents Nos. 1,407,147 and 1,456,591.

As shown more particularly in Figs. 2, 3 and 4, the thermocouple is associated with a d'Arsonval instrument including a permanent magnet 10, a dial 11, a moving coil 12, and a pointer 13. The construction of this instrument is well known in the art. The various parts may be mounted in a suitable casing 14 constructed of any suitable insulating material, such as a phenol formaldehyde resin. The specific casing illustrated is provided with a glass cover 15 positioned between a flange 16 on the casing and a metallic ring 17 positioned interiorly of the casing. For the purpose of illustration, the instrument is mounted on a steel panel 18.

In accordance with standard practice, parts of the instrument such as the magnet 10, the dial 11, and the ring 17 are connected through a suitable conductor 19 to the terminal G. If the terminal G is grounded, the aforesaid parts are maintained at ground potential. The moving coil 12 is connected through conventional d'Arsonval springs 20 and 21 to the terminal strips 4 and 5 of the thermojunction J. Consequently, the coil 12 is energized in accordance with the direct current output of the thermojunction J.

In order to illustrate the various troubles encountered in thermocouple instruments, let it be assumed that the terminal A is improperly grounded. With these connections as illustrated in Fig. 2, any failure of the heater element 1 would result in the entire potential difference across the terminals A and G being applied between the ring 17 and the panel 18, which is assumed to be at ground potential. The potential difference between the ring 17 and the panel 18 may be several hundred or more volts, the exact value depending upon the regulation of the circuit connected to the terminals A and G. Thermocouple instruments generally are employed for high frequency measurements. The circuits encountered in the high frequency field, especially those circuits of the tuned type, have extremely poor regulation. Although the potential difference between the terminals A and G during normal operation may be of the order of 10 volts, when the heater element 1 fails this voltage may rise to several hundred volts or more because of the poor regulation of the associated circuit as above set forth. The presence of such a high voltage between the ring 17 and the panel 18 may result in the failure of the insulating material of the casing 14 with resulting swelling and breakdown of its insulating properties as shown by sparks between the ring 17, case 14, and panel 18.

Fig. 3 is similar to Fig. 2 except for the correct grounding of the ground terminal G. Assuming that the thermocouple heater element fails between the thermojunction and the terminal G, the entire voltage between the terminals A and G is applied between the coil 12 and the magnet 10 and between the pointer 13 and the dial 11. If the regulation of the circuit associated with the terminals A and G is poor, as often is the case, a discharge may take place between the magnet 10 and the coil 12 or between the dial 11 and the pointer 13 with resultant damage to the d'Arsonval instrument. Such breakdowns have been obtained in practice. It will be noted that such a breakdown necessitates the replacement or repair of a costly and sensitive instrument.

The circuits employed for connecting a 'dArsonval instrument to a thermocouple are shown somewhat more clearly in Fig. 4. It will be noted in this figure that the magnet 10 and the dial 11 are connected to the ground terminal G of the thermocouple. Moreover, the pointer 13 and the moving coil 12 are connected through the strips 4 and 5 to the wires 2 and 3 of the thermojunction. If for any reason the heater element 1 fails between the thermojunction J and the ground terminal G, the entire potential difference between the terminals A and G is applied between the circuit including the pointer 13 and the moving coil 12 and the circuit including the magnet 10 and the dial 11. Consequently, a breakdown may occur between closely spaced points of these circuits.

In the prior art every effort was made to provide a symmetrical thermocouple. For this reason, a uniform heater element 1 was provided and the thermojunction J was positioned exactly equi-distant from the terminals A and G.

In accordance with applicants' invention, the heater element 1 is designed to fail initially between the junction of the thermojunction with the heater element 1 and the terminal A. This means that even though the heater element fails, the circuit associated with the wires 2 and 3 of the thermojunction remains connected through a portion of the heater element 1 to the ground terminal G and the circuit associated therewith. Consequently, the maximum potential difference between the circuit associated with the wires 2 and 3 and the circuit associated with the ground terminal G is restricted to the potential drop in the portion of the heater element 1 therebetween.

The advantages derived from the design of the heater element to fail initially between the thermal junction J and the terminal A may be understood more clearly by further reference to Figs. 3 and 4. As previously pointed out, failure of the heater element between the thermal junction J and the terminal G may result in the application of substantial voltages between the coil 12 and the magnet 10 and between the pointer 13 and the dial 11. When the instrument is connected to a circuit having poor regulation, the failure of the heating element may result in the application of several hundred volts between the aforesaid parts. This high voltage may produce an arc discharge between the parts to damage seriously the instrument. Since the d'Arsonval instrument may cost several times as much as the thermocouple, it is undesirable that failure of the thermocouple also should result in damage to the instrument.

Referring to Fig. 4, it will be observed that if the heater element 1 fails between the junction J and the terminal A, the magnet 10 and the dial 11 remain connected to the coil 12 and the pointer 13 through the portion of the heater element remaining between the junction J and the terminal G. For this reason, the maximum voltage which can appear between the magnet 10 or the dial 11 and the coil 12 or the pointer 13, is restricted to the voltage drop across the portion of the heater element remaining between the thermal junction J and the terminal G. Since this voltage will always be relatively low, no damage can be done to the d'Arsonval instrument by such a failure of the heater element.

Failure of the heater element 1 at the proper point may be assured by various constructions. For example, the portion of the heater element 1 between the thermojunction J and the terminal A may be constructed with a reduced cross-section in order to assure failure in this section initially. Preferably, however, failure in the desired portion of the heater element 1 is assured by positioning the thermojunction J asymmetrically with respect to the terminals A and G. To this end the thermojunction J is moved slightly closer to the ground terminal G than to the terminal A. The effect of such a movement of the thermojunction J may be explained with reference to Figs. 5 to 6a.

In Fig. 5 a thermocouple is shown wherein the thermojunction J is symmetrically mounted with respect to the terminals A and G. For such a thermocouple a symmetrical heating curve is obtained, as illustrated in Fig. 5a. In Fig. 5a ordinates represent temperature and abscissae represent distance from the terminal A to the terminal G. It will be noted in Fig. 5a that the heater element 1 has a temperature curve represented in full line for a single value of heater current which has a slight dip adjacent the thermojunction J. This dip is present because of the cooling effects of the wires 2 and 3. The fusing temperature of the heater element is represented in Fig. 5a by a dotted line. From an inspection of Fig. 5a, it will be noted that the thermojunction J divides the heater element 1 into two equal portions having equal maximum temperatures. Consequently, there is no assurance that a predetermined one of the portions will fail upon overload before the other portion.

As shown in Fig. 6, applicants move the thermojunction towards the terminal G of the thermocouple. Such a movement results in an asymmetric positioning of the thermojunction with respect to the terminals which provides a greater length of heater element between the thermojunction J and the terminal A than between the thermojunction and the terminal G.

The heating curve for the thermocouple of Fig. 6 is illustrated in Fig. 6a. The notation and arrangement of curves in Fig. 6a correspond to those of Fig. 5a. By an inspection of Fig. 6a, it will be noted that the effect of the movement of the thermojunction J is to provide a larger maximum temperature for the portion of the heater element between the thermojunction J and the terminal A than for the portion between the thermojunction J and the terminal G. Consequently, on an overload the portion of the heater element between the thermojunction J and the terminal A tends to fail first. Such a failure leaves the dial 11, the magnet 10, the pointer 13, and the moving coil 12 all connected to the ground terminal G. For this reason, a dangerous potential difference between any of these parts cannot be present.

Even though the heater element 1 fails between the thermojunction J and the ground terminal G, protection may be afforded the measuring instrument by providing adequate capacitance between the strips 4 and 5 and one or more of the terminals, preferably including the terminal G. In prior art thermocouples, the strips 4 and 5 were constructed of narrow ribbon, each having a capacitance to one of the terminals A or G of the order of 6 micromicrofarads. In accordance with the invention, this capacitance is increased to a value substantially greater than 6 micromicrofarads, and preferably above 50 micromicrofarads.

Such a capacitance, in effect, provides a shunt for high frequency currents between the circuit including the moving coil 12 and the pointer 13, and the circuit including the magnet 10 and the dial 11. With an adequate capacitance thus provided, the potential difference between these circuits may be restricted to a small value when the heater element 1 fails between the thermojunction J and the ground terminal G despite the association of an energizing circuit having poor regulation with the terminals A and G. The added capacitance may be provided readily by employing relatively wide strips 4 and 5 which may be in the form of copper sheet. Although a thermocouple may be employed having a single pair of strips 4 and 5, each capacitively coupled to one of the terminals A or G, the thermocouple in Fig. 4 employs a capacitive coupling between each of the strips 4 and 5 and each of the terminals A and G. If a capacitive coupling is employed for only one of the terminals, preferably the terminal G is selected.

With the increase in capacitive coupling between the strips 4 and 5 and the terminals A and G, some precautions must be exercised in order to prevent the resonance of the thermocouple circuits including the capacitive couplings from influencing the performance of the thermocouple during normal conditions of operation thereof. To this end the thermocouple may be represented by an equivalent circuit, as illustrated in Figs. 7 and 8, wherein the heater element 1 is represented by impedances $Z$, $Za$. The impedances of the strips 4 and 5 are represented by impedances $Zb$, $Zc$, $Zd$, and $Ze$, and the capacitive couplings between the strips 4 and 5 and the terminals A and G are represented by capacitors C. For simplicity, computations may be carried out for the quarter section of the thermocouple illustrated in Fig. 8.

In a specific example, a capacitance of 115 micromicrofarads was provided between each of the strips 4 and 5 and each of the terminals A and G. With such a capacitance the thermocouple was found to have resonant points at 99 and 185 megacycles. The lowest value, 99 megacycles, is about double a standard 50 megacycle frequency. Consequently, such a thermocouple may be considered adequate for 50 megacycle instruments. An actual test of such a thermocouple clearly demonstrated complete protection for the d'Arsonval instrument associated therewith.

Still further protection for the thermocouple instrument may be afforded by proper selection of the material employed in the heater element 1. Heretofore, it has been customary to employ heater elements having positive temperature coefficients of resistance. For example, a heater element consisting of a 20% iridium, 80% platinum alloy having a temperature coefficient of resistance of approximately 0.0008 per degree C. has been employed.

As previously indicated, the current flowing through the heater element of a thermocouple is determined substantially by the external energizing circuit for the heater element. When a heater element having a positive temperature coefficient of resistance is employed, each unit of current flowing therethrough produces more heat when the heater is operating at an elevated temperature than when the heater is operating at a lower temperature. It will be remembered that the temperature of the heater element varies approximately as the square of current flowing therethrough.

By employing a material having a negative temperature coefficient of resistance, each unit of current flowing through the heater element is less effective in producing heat when the heater element is operating at an elevated temperature than when the heater is operating at a lower temperature. Consequently, such a heater element would be much more satisfactory in withstanding overloads.

Because of certain characteristics carbon may be employed as a heater element. These characteristics render carbon suitable only for extremely small supersensitive thermocouple heaters. Carbon is unsuitable for larger thermocouple heater elements such as those designed for currents in excess of 0.010 amperes. A further objection to carbon is that thermojunctions cannot be attached thereto by the usual methods of soldering or welding.

As examples of metallic heater elements suitable for thermocouples, reference may be made to an alloy containing by weight 24% copper, 36% nickel and 40% manganese. An alloy of this composition has been found to have a negative temperature coefficient of resistance of 0.0032 per degree C.

Another alloy exhibiting a negative temperature coefficient of resistance is an alloy containing 42% copper, 33% nickel and 25% manganese. A still further alloy contains 60 to 70% iron, 25 to 27% chromium and 5 to 15% aluminum.

Although the invention has been disclosed with reference to certain specific embodiments thereof, it is obvious that numerous modifications are possible. Therefore, the invention is to be restricted only by the appended claims when interpreted in view of the prior art.

We claim as our invention:

1. In a thermocouple, a heater element including two portions designed to heat to substantially different maximum temperatures, and heat responsive means connected to said heater element intermediate said two portions, said portions being proportioned to assure initial failure of the portion designed to heat to the higher of said maximum temperatures in response to excessive energization of said heater element.

2. In a converter device, terminal means, an electrical heater associated with said terminal means for energization therethrough, and heat responsive means electrically connected to said electrical heater, said heat responsive means being asymmetrically positioned relative to said terminal means, sufficiently to assure initial failure of a predetermined one of the sections into which said heat responsive means divides said heater when excessive current is passed therethrough.

3. In an electrical converter device, a plurality of terminals, an electrical heater associated with said terminals for energization therethrough, electroconductive means electroconductively associated with said electrical heater intermediate said terminals, said electrical heater being proportioned to fail initially between said electroconductive means and a predetermined one only of said terminals in response to the increase in temperature of said electrical heater when subjected to abnormal energization through said terminals.

4. In a thermocouple device, a pair of terminals, a uniform electrical heater connected between said terminals for energization therethrough, and electroconductive means conductively connected to said heater intermediate said terminals, the point of connection of said electroconductive means to said electrical heater being asymmetric relative to said terminals by an amount sufficient to assure failure of said electrical heater between said electroconductive means and a predetermined one only of said terminals in response to excessive energization of said electrical heater.

5. In a thermocouple device, a pair of terminals, a uniform electrical heater connected between said terminals for energization therethrough, and a thermojunction connected to said electrical heater at a point dividing the heater into two portions differing in length, said thermojunction being effective for reducing the operating temperature of the shorter portion of said electrical heater adjacent one of said terminals below that of the longer portion of said electrical heater adjacent another of said terminals sufficiently to assure prior failure of said longer portion in response to excessive energization of said electrical heater.

6. In a measuring device, an electrical measuring instrument, a thermocouple comprising a heater element having two terminals, means connecting said electrical measuring instrument for energization in accordance with the output of said thermocouple, said connecting means including a circuit extending from first parts of said measuring instrument through a portion of said heater element to a first one of said terminals, said portion of said heater element being proportioned to have a substantially greater overload capacity than that of the remainder of said heater element, and means connecting second parts of said measuring instrument to said first one of said terminals, whereby failure of said heater element on overload occurs at a point displaced from said portion of said heater element.

7. In a measuring device, an electrical measuring instrument, a thermocouple having a heater element including two portions designed to heat to substantially different maximum temperatures whereby the portion heated to the higher of said maximum temperatures fails initially in response to overloading of said heater element, and having a terminal connected to the portion of said heater element designed for operation at the lower of said maximum temperatures, means connecting said electrical measuring instrument for energization in accordance with the output of said thermocouple, said connecting means including means for connecting first parts of said measuring instrument to said terminal through said connected portion of said heater element, and means for connecting second parts of said measuring instrument to said terminal.

8. In a measuring device, an electrical measuring instrument, a thermocouple including a heater element, a pair of terminals for said heater element, and a thermojunction attached to said heater element at a point dividing said heater element into unequal portions proportioned to assure initial failure of the larger of said unequal portions in response to overenergization of said heater element, means connecting said measuring instrument for energization from said thermojunction, and means connecting parts of said measuring instrument to that one of said terminals associated with the smaller of said portions.

9. In a thermocouple device, a heater element, terminal means for said heater element, a thermojunction associated with said heater element, electroconductive supporting members for said thermojunction, and means positioning said supporting members adjacent said terminal means to form therewith a capacitive coupling, said terminal means and supporting members being proportioned to provide a capacitive coupling between said thermojunction and said terminal means of at least 50 micromicrofarads.

10. In a measuring device, an electrical measuring instrument, a thermocouple including a metallic heater element having a negative temperature coefficient of resistance, a pair of terminals for said heater element, and a thermojunction attached by a metallic bond to said heater element at a point dividing said heater element into unequal portions, means connecting said measuring instrument for energization from said thermojunction, and means connecting parts of said measuring instrument to that one of said terminals associated with the smaller of said portions, the larger of said portions being proportioned to fail initially in response to overloading of said heater element.

11. In a measuring device, an electrical measuring instrument, a thermocouple including a metallic heater element having a negative temperature coefficient of resistance, a pair of terminals for said heater element, and a thermojunction attached by a metallic bond to said heater element at a point dividing said heater element into unequal portions, means for establishing a path having substantial capacitance between said thermojunction and at least one of said terminals, means connecting said measuring instrument for energization from said thermojunction, and means connecting parts of said measuring instrument to that one of said terminals associated with the smaller of said portions, the larger of said portions being proportioned to fail initially in response to overloading of said heater element.

12. In an electrical measuring device for measuring high frequency quantities, an electrical measuring instrument, a thermocouple comprising a heater element having two terminals, means connecting said electrical measuring instrument for energization in accordance with the output of said thermocouple, said connecting means including a circuit extending from first parts of said measuring instrument through a portion of said heater element to a first one of said terminals, means connecting second parts of said measuring instrument to said first one of said terminals, and means establishing a capacitive coupling between said first and second parts of said measuring instrument of at least 50 micromicrofarads.

FERNALD S. STICKNEY.
RICHARD C. HITCHCOCK.